(12) United States Patent
Jang et al.

(10) Patent No.: US 10,551,883 B2
(45) Date of Patent: Feb. 4, 2020

(54) ELECTRONIC DEVICE WITH DETACHABLE STORAGE MEDIUM

(71) Applicant: Samsung Electronics Co., Ltd., Gyeonggi-do (KR)

(72) Inventors: Hyuk-Jae Jang, Seoul (KR); Jung-Tae Kim, Gyeonggi-do (KR); Sang-Hyeon Kim, Gyeongsangbuk-do (KR); Sang-Hun Park, Busan (KR); Myung-Hyo Bae, Daegu (KR); Sun-Pyo Yun, Gyeonggi-do (KR); Byoung-Uk Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/415,608

(22) Filed: Jan. 25, 2017

(65) Prior Publication Data

US 2017/0242461 A1 Aug. 24, 2017

(30) Foreign Application Priority Data

Feb. 19, 2016 (KR) .................. 10-2016-0019756

(51) Int. Cl.
*G06F 1/18* (2006.01)
*H04B 1/3818* (2015.01)
*H04B 1/3827* (2015.01)

(52) U.S. Cl.
CPC .............. *G06F 1/186* (2013.01); *G06F 1/181* (2013.01); *H04B 1/3818* (2015.01); *H04B 1/3833* (2013.01)

(58) Field of Classification Search
CPC ...... G06F 1/1656; G06F 1/186; G06F 1/1658; G06F 1/181; H04B 1/3833; H04B 1/3818
See application file for complete search history.

(56) References Cited

U.S. PATENT DOCUMENTS

| | | | |
|---|---|---|---|
| 7,217,148 B1 * | 5/2007 | Chen | G06K 7/0021 439/326 |
| 8,462,514 B2 * | 6/2013 | Myers | G06K 13/08 361/754 |

(Continued)

FOREIGN PATENT DOCUMENTS

| | | |
|---|---|---|
| CN | 102324654 | 1/2012 |
| CN | 103515781 | 1/2014 |

(Continued)

OTHER PUBLICATIONS

International Search Report dated Apr. 28, 2017 issued in counterpart application No. PCT/KR2017/000846, 13 pages.

(Continued)

*Primary Examiner* — Binh B Tran
*Assistant Examiner* — Douglas R Burtner
(74) *Attorney, Agent, or Firm* — The Farrell Law Firm, P.C.

(57) ABSTRACT

An electronic device is provided which includes a housing including a through-hole positioned in a side face, a socket disposed within the housing, and having an entrance aligned with the through-hole, a biasing member mounted on the housing, and disposed between the through-hole and the entrance of the socket, and a tray in which at least one storage medium is seated. The tray is inserted into/extracted from the housing through the through-hole, and inserted into the socket from the inside of the housing through the entrance. During the insertion or extraction of the tray, the biasing member may limit a movement range of the storage medium in the tray.

21 Claims, 11 Drawing Sheets

(56) References Cited

U.S. PATENT DOCUMENTS

| | | | |
|---|---|---|---|
| 8,564,965 B2* | 10/2013 | Sloey | H04B 1/3816 |
| | | | 361/752 |
| 9,232,668 B2 | 1/2016 | Sloey et al. | |
| 9,907,197 B2* | 2/2018 | Tan | G06K 7/0021 |
| 2009/0267677 A1 | 10/2009 | Myers et al. | |
| 2013/0050913 A1* | 2/2013 | Dong | G06F 1/1656 |
| | | | 361/679.01 |
| 2014/0002971 A1* | 1/2014 | Chung | H05K 5/0286 |
| | | | 361/679.01 |
| 2014/0049920 A1* | 2/2014 | Sloey | H04B 1/3816 |
| | | | 361/727 |
| 2014/0154903 A1 | 6/2014 | Wang et al. | |
| 2014/0268516 A1 | 9/2014 | Fathollahi et al. | |
| 2014/0273646 A1* | 9/2014 | Yun | H01R 12/714 |
| | | | 439/629 |
| 2014/0342601 A1 | 11/2014 | Matsunaga | |
| 2015/0022981 A1* | 1/2015 | Tan | G06K 7/0021 |
| | | | 361/756 |
| 2015/0056851 A1* | 2/2015 | Zhang | H04B 1/3816 |
| | | | 439/527 |
| 2015/0126250 A1 | 5/2015 | Yoon et al. | |
| 2015/0201518 A1* | 7/2015 | Hsu | H05K 7/1461 |
| | | | 361/807 |
| 2015/0245518 A1 | 8/2015 | Hwang et al. | |
| 2016/0164226 A1* | 6/2016 | Hirata | H04B 1/3816 |
| | | | 439/155 |
| 2016/0359247 A1* | 12/2016 | Hirata | H01R 12/714 |
| 2018/0219312 A1 | 8/2018 | Joo et al. | |

FOREIGN PATENT DOCUMENTS

| | | |
|---|---|---|
| CN | 104167639 | 11/2014 |
| CN | 105186156 | 12/2015 |
| JP | 2015-526834 | 9/2015 |
| KR | 1020150051866 | 5/2015 |
| KR | 1020150099010 | 8/2015 |
| KR | 1020160012859 | 2/2016 |
| WO | WO 2016/024840 | 2/2016 |

OTHER PUBLICATIONS

European Search Report dated Jan. 17, 2019 issued in counterpart application No. 17753388.2-1221, 8 pages.

Chinese Office Action dated Nov. 27, 2019 issued in counterpart application No. 201780012142.1, 19 pages.

* cited by examiner

ELECTRONIC DEVICE WITH DETACHABLE STORAGE MEDIUM

PRIORITY

This application claims priority under 35 U.S.C. § 119(a) to Korean Patent Application Serial No. 10-2016-0019756, which was filed in the Korean Intellectual Property Office on Feb. 19, 2016, the entire content of which is incorporated herein by reference.

BACKGROUND

1. Field of the Disclosure

The present disclosure generally relates to an electronic device, and more particularly, to an electronic device with a detachable storage medium.

2. Description of the Related Art

Typically, an electronic device refers to a device that performs a specific function according to a program executed on the electronic device (e.g., an electronic scheduler, a portable multimedia player, a mobile communication terminal, a tablet PC, an image/sound device, a desktop/laptop PC, a home appliance or a vehicular navigation system). For example, an electronic device may output information stored therein as sound or an image. As the degree of integration of such an electronic device has increased, and high speed/large capacity wireless communication has become popular, various functions have recently been integrated in a single mobile communication terminal. For example, various functions, such as an entertainment function (e.g., a game function), a multimedia function (e.g., a music/video reproducing function), a communication and security function for mobile banking, a schedule management function, and an e-wallet function, are integrated in a single electronic device, in addition to a communication function.

Among the components or additional devices of an electronic device, a memory card may be useful for storing various document files, multimedia files, and the like. A memory card may be useful for expanding storage capacity in storing, for example, various information or data received by the electronic device, generated by the user, or acquired through the electronic device.

An electronic device that is personally used (e.g., a mobile communication terminal) may be provided with a subscriber identification module (SIM) for user authentication, security, and the like. The subscriber identification module may take a form of a card that is similar to a memory card. For example, the user identification module may be formed as a SIM card. When a storage medium, such as the memory card or the SIM card, is detachably provided to the electronic device, it may be useful for the expandability of a miniaturized electronic device, such as a mobile communication terminal.

In making the external appearance of a miniaturized electronic device attractive, a single housing and/or a case structure (e.g., a uni-body structure) using a metallic material may be used. In the uni-body structure, an audio jack and the like may be provided in the housing to connect an external device or to connect a wired charger, an earphone, and the like. In an electronic device with a uni-body structure, a tray structure may be used in detachably providing a storage medium in order to enable expandability. For example, a tray in which a storage medium (e.g., a memory card or a SIM card) is seated may be inserted into the housing to mount the storage medium in the electronic device.

However, while the tray is inserted into the electronic device and/or the housing, or is extracted from the housing, the storage medium may move or separate from the tray such that the storage medium may be damaged.

SUMMARY

According to an aspect of the present disclosure, an electronic device is provided that is capable of suppressing, in a detachable storage medium mounting structure using a tray, the movement of a storage medium during the insertion of the tray into a housing or a socket or during the extraction of the tray from the housing or the socket.

According to another aspect of the present disclosure, an electronic device is provided that is capable of preventing a storage medium from interfering with another structure (e.g., an inner wall of a housing or a casing of a socket) by suppressing the movement of the storage medium in the tray during the insertion of the storage medium into the housing or the socket or during the extraction of the storage medium from the housing or the socket.

According to another aspect of the present disclosure, an electronic device is provided that is capable of preventing a storage medium and/or other structures within the housing from being damaged by preventing the storage medium from interfering with the other structures.

Accordingly an aspect of the present disclosure provides an electronic device which includes a housing including a through-hole positioned in a side face, a socket disposed within the housing, and having an entrance aligned to the through-hole, a biasing member mounted on the housing, and disposed between the through-hole and the entrance of the socket, and a tray in which at least one storage medium is seated. The tray is inserted into/extracted from the housing through the through-hole, and inserted into the socket from the inside of the housing through the entrance. During the insertion or extraction of the tray, the biasing member may limit a movement range of the storage medium in the tray.

Another aspect of the present disclosure provides an electronic device which includes a housing including a first face that faces in a first direction, a second face that faces in a second direction that is opposite to the first direction, and a side face that at least partially encloses a space between the first face and the second face, the housing further includes a through-hole in the side face, a touch screen display disposed within the housing, and exposed through the first face, a biasing member disposed between the display and the second face within the housing, and integrally formed with the side face, a circuit board disposed between the biasing member and the second face within the housing, a socket disposed between the circuit board and the biasing member within the housing and including a first plate that faces in the first direction and a second plate that faces in the second direction, the socket further including an entrance formed to face the through-hole and a space leading to the entrance, a plurality of conductive contacts disposed at a side of the second plate to face the space of the socket, a tray that slides through the through-hole and the entrance, and includes a seating hole to transport a storage medium and/or a SIM card, and a protrusion that protrudes from the biasing member toward the second plate and is configured to elastically bias the storage medium and/or the SIM card toward the second plate when the tray is inserted into the space of the socket in a state where the storage medium and/or the SIM card are included in the tray.

Another aspect of the present disclosure provides an electronic device. During the insertion of the tray into the housing or during the extraction of the tray from the housing, the biasing member provided in the housing elastically biases a storage medium to bring the storage medium into close contact with the tray (or to limit the movement range of the storage medium). Thus, it is possible to prevent the storage medium from being moved in the tray or separated from the tray. For example, the storage medium may enter into the socket without interfering with other structures within the electronic device, and may be maintained in the state where it is in close contact with the tray when the storage medium is extracted. During the insertion or extraction of the tray, the storage medium is in close contact with the tray and does not interfere with other structures, and the insertion or extraction of the tray may be performed smoothly. Further, it is possible to prevent the storage medium or the other structures from being damaged during insertion or extraction.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
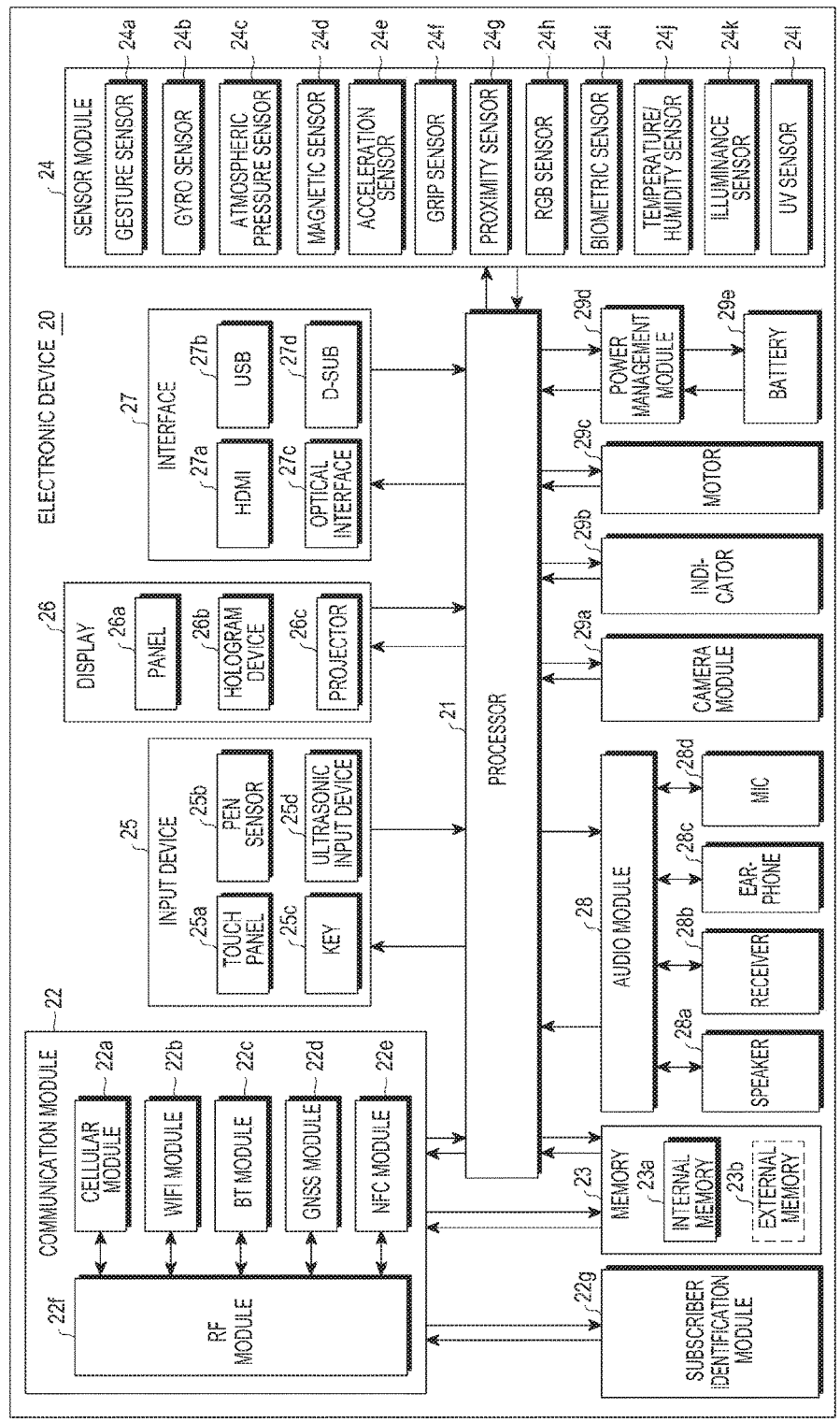
FIG. 1 is a block diagram of an electronic device, according to an embodiment of the present disclosure.

Hereinafter, an embodiment of the present disclosure will be described with reference to the accompanying drawings. The embodiments and the terms used herein do not limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are defined differently in a context. As used herein, singular forms may include plural forms as well unless the context clearly indicates otherwise. The expressions "a first", "a second", "the first", or "the second" as used in an embodiment of the present disclosure may modify various components regardless of the order and/or the importance but do not limit the corresponding components. When an element (e.g., first element) is referred to as being "functionally or communicatively connected," or "directly coupled" to another element (second element), the element may be connected directly to the other element or connected to the other element through another element (e.g., third element).

The expression "configured to" as used in an embodiment of the present disclosure may be interchangeably used with, for example, "suitable for", "having the capacity to", "designed to", "adapted to", "made to", or "capable of" in terms of hardware or software, according to the circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

An electronic device, according to an embodiment of the present disclosure, may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, eyeglasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasound machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), point of sales (POS) terminal, or Internet of things (IoT) device (e.g., a light bulb, various sensors, electric or gas meter, a sprinkler device, a fire alarm, a thermostat, a streetlamp, a toaster, a sporting good, a hot water tank, a heater, a boiler, etc.). An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. The electronic device is not limited to the above described devices. In the present disclosure, the term "user" may indicate a person using an electronic device or a device (e.g., an artificial intelligence electronic device) using an electronic device.

FIG. 1 is a block diagram of an electronic device, according to an embodiment of the present disclosure.

The electronic device 20 includes at least one processor (e.g., AP) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and a motor 29c. The processor 21 may drive, for example, an operating system or an application program to control a plurality of hardware or software components connected thereto, and may also perform various data processing and arithmetic operations. The processor 21 may be implemented by, for example, a system-on-chip (SoC). The processor 21 may further include a graphic processing unit (GPU) and/or an image signal processor. The processor 21 may include at least some components (e.g., a cellular module 22a) among the components illustrated in FIG. 1. The processor 21 may load a command or data received from at least one of the other components (e.g., a non-volatile memory) in a volatile memory to process the command and data, and may store resulting data in a non-volatile memory.

The communication module 22 may have a configuration that is the same as, or similar to, a communication interface. The communication module 22 includes, for example, the cellular module 22a, a WiFi module 22b, a Bluetooth module 22c, a GNSS module 22d, an NFC module 22e, and a radio frequency (RF) module 22f. The cellular module 22a may provide, for example, a voice call, a video call, a message service, or an Internet service through, for example, a communication network. The cellular module 22a may perform authentication of the electronic device 20 within the communication network by using the subscriber identification module (e.g., a SIM card) 22g. The cellular module 22a may perform at least some of the functions that may be provided by the processor 21. The cellular module 22a may include a communication processor (CP). At least some (e.g., two or more) of the cellular module 22a, the WiFi module 22b, the Bluetooth module 22c, the GNSS module 22d, and the NFC module 22e may be incorporated in a single integrated chip (IC) or an IC package. The RF module 22f may transmit/receive, for example, a communication signal (e.g., an RF signal). The RF module 22f may include, for example, a transceiver, a power amp module (PAM), a frequency filter, a low noise amplifier (LNA), or an antenna. At least one of the cellular module 22a, the WiFi module 22b, the Bluetooth module 22c, the GNSS module 22d, and the NFC module 22e may transmit/receive an RF signal through one or more separate RF modules. The subscriber identification module 22g may include, for example, a card that includes a subscriber identification module and/or an embedded SIM, and may also include subscriber identification information (e.g., integrated circuit card IDentifier (ICCID)) or subscriber information (e.g., international mobile subscriber identity (IMSI)).

The memory 23 includes, for example, an internal memory 23a or an external memory 23b. The internal memory 23a may include at least one of, for example, a volatile memory (e.g., a dynamic random access memory (DRAM), a static random access memory (SRAM), or a synchronous dynamic random access memory (SDRAM), a non-volatile memory (e.g., an one time programmable read only memory ROM (OTPROM), a programmable read only memory (PROM), an erasable programmable read only memory (EPROM), an electrically erasable programmable read only memory (EEPROM), a mask ROM, a flash ROM, a flash memory, a hard drive, and a solid state drive (SSD). The external memory 23b may further include a flash drive (e.g., a compact flash (CF), a secure digital (SD), a micro secure digital (micro-SD), a mini secure digital (Mini-SD), an extreme digital (xD), a multi-media card (MMC), or a memory stick). The external memory 23b may be functionally or physically connected to the electronic device 20 through various interfaces.

The sensor module 24 may measure a physical quantity or may sense an operating status of the electronic device 20, and may then convert the measured or sensed information into electric signals. The sensor module 24 may include at least one of, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., RGB (red, green, blue) sensor), a biometric sensor 24i, a temperature/humidity sensor 24j, an illuminance sensor 24k, and an ultra-violet (UV) sensor 24l. Additionally or alternatively, the sensor module 24 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 24 may further include a control circuit for controlling one or more sensors incorporated therein. The electronic device 20 may further include a processor configured to control the sensor module 24 as a part of the processor 21 or separate from the processor 21 to control the sensor module 24 while the processor 21 is in a sleep state.

The input device 25 includes, for example, a touch panel 25a, a (digital) pen sensor 25b, a key 25c, or an ultrasonic input device 25d. As the touch panel 25a, at least one of, for example, a capacitive type touch panel, a resistive type touch panel, an infrared type touch panel, and an ultrasonic type panel may be used. In addition, the touch panel 25a may further include a control circuit. The touch panel 25a may further include a tactile layer so as to provide a tactile reaction to a user. The (digital) pen sensor 25b may be, for example, a portion of the touch panel, or may include a separate recognition sheet. The key 25c may include, for example, a physical button, an optical key, or a keypad. The ultrasonic input device 25d may sense, through a microphone 28*d*, ultrasonic waves that are generated by an input tool to confirm data corresponding to the sensed ultrasonic waves.

The display 26 includes a panel 26*a*, a hologram device 26*b*, a projector 26*c*, and/or a control circuit for controlling these components. The panel 26*a* may be implemented to be, for example, flexible, transparent, or wearable. The panel 26*a* may include a touch panel 25*a* and one or more modules. The panel 26*a* may include a pressure sensor (or a force sensor) that is capable of measuring the intensity of a pressure for a user's touch. The pressure sensor may be integrally implemented with the touch panel 25*a*, or implemented by one or more sensors separately from the touch panel 25*a*. The hologram device 26*b* may show a stereoscopic image in the air using interference of light. The projector 26*c* may project light onto a screen so as to display an image. The screen may be located, for example, inside or outside the electronic device 20. The interface 27 may include, for example, an HDMI 27*a*, a USB 27*b*, an optical interface 27*c*, or a D-subminiature (D-sub) 27*d*. Additionally or alternatively, the interface 27 may include, for example, a mobile high-definition link (MHL) interface, an SD card/multi-media card (MMC) interface, or an infrared data association (IrDA) standard interface.

The audio module 28 may bi-directionally convert, for example, sound and electric signals. The audio module 28 may process sound information input or output through, for example, a speaker 28*a*, a receiver 28*b*, an earphone 28*c*, or a microphone 28*d*. The camera module 29*a* is a device that is capable of photographing, for example, a still image and a video image, and the camera module 29*a* may include at least one image sensor (e.g., a front sensor or a rear sensor), a lens, an image signal processor (ISP), or a flash (e.g., LED or xenon lamp). The power management module 29*d* may manage, for example, the electric power of the electronic device 20. The power management module 29*d* may include a power management integrated circuit (PMIC), a charger integrated circuit (IC), or a battery gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual charge capacity of the battery 29*e*, and a voltage, a current, or a temperature during the charge. The battery 29*e* may include, for example, a rechargeable battery and/or a solar battery.

The indicator 29*b* may indicate a specific status of the electronic device 20 or a part thereof (e.g., the processor 21), such as a booting status, a message status, or a charged status. The motor 29*c* may convert an electric signal into a mechanical vibration, and may generate, for example, a vibration or a haptic effect. The electronic device 20 may include, for example, a mobile TV support device (e.g., a GPU) that is capable of processing media data according to a standard of, for example, digital multimedia broadcasting (DMB), digital video broadcasting (DVB), or MediaFlo™ Each of the above-described component elements of hardware may be configured with one or more components, and the names of the corresponding component elements may vary based on the type of electronic device. An electronic device (e.g., the electronic device 20) may omit some elements or may further include additional elements, or some of the elements of the electronic device may be combined with each other to configure one entity, in which case the electronic device may identically perform the functions of the corresponding elements prior to the combination.

Figure 2:
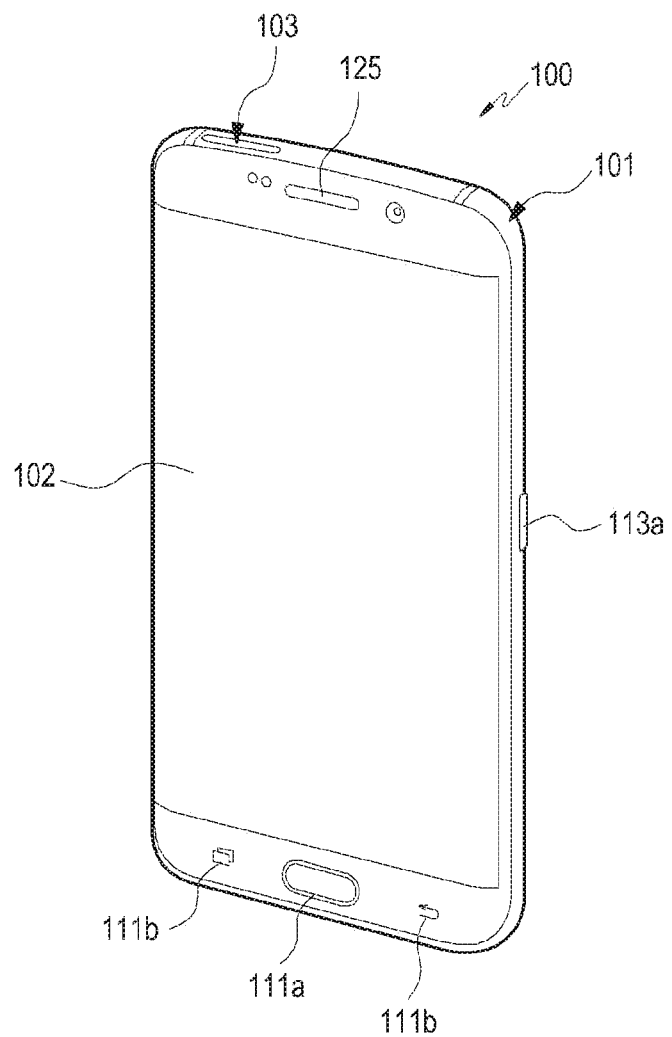
FIG. 2 is a perspective view illustrating an electronic device, according to an embodiment of the present disclosure.

FIG. 2 is a perspective view illustrating an electronic device, according to an embodiment of the present disclosure.

Figure 3:
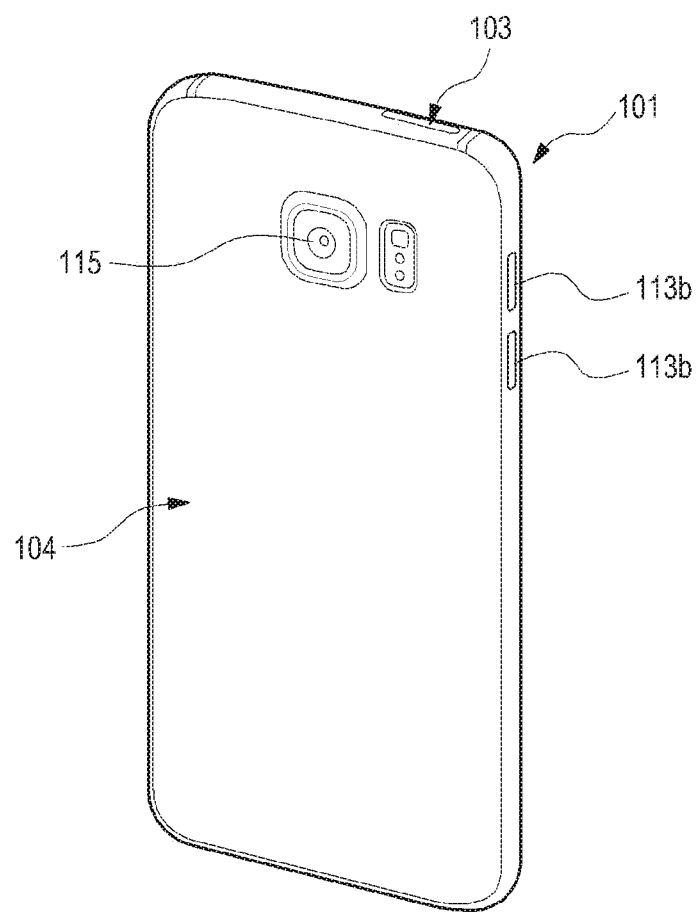
FIG. 3 is a perspective view illustrating the rear face of an electronic device, according to an embodiment of the present disclosure.

FIG. 3 is a perspective view illustrating the rear face of an electronic device, according to an embodiment of the present disclosure.

Figure 4:
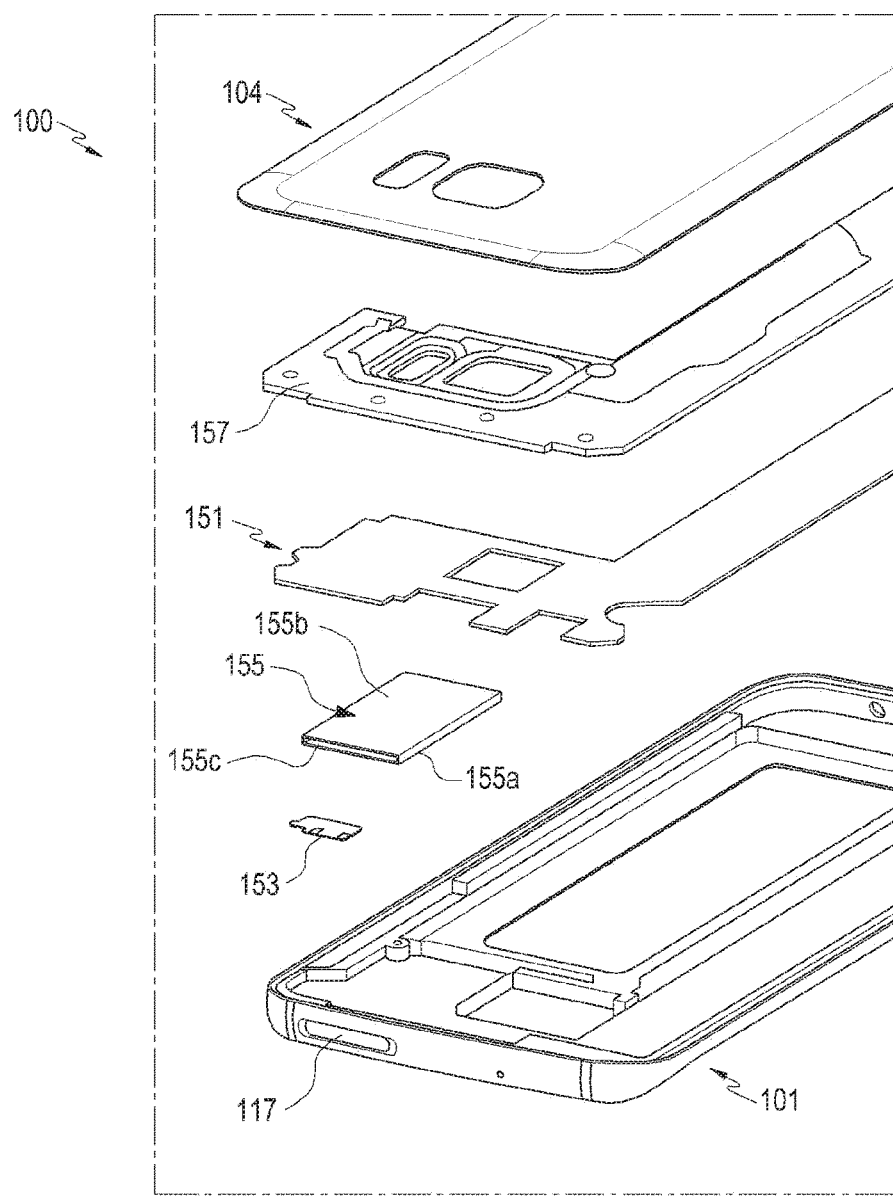
FIG. 4 is an exploded perspective view illustrating the electronic device, according to an embodiment of the present disclosure.

FIG. 4 is an exploded perspective view illustrating the electronic device, according to an embodiment of the present disclosure.

Referring to FIGS. 2 to 4, the electronic device 100 includes a housing 101, a front cover 102, and a rear cover 104.

In an embodiment of the present disclosure, the housing may include a first face (e.g., the front face) that faces in a first direction, a second face (e.g., the rear face) that faces in a second direction that is opposite to the first direction, and a side face that encloses a space between the first face and the second face. The front cover 102 may be mounted on, for example, the front face of the housing 101, and may include a display module (e.g., the panel 26*a* in FIG. 1). Because the front cover 102 includes the display module in which the touch panel is incorporated, at least a partial region may be provided as a touch screen display. Input devices (e.g., various keys 111*a* and 111*b*), an output device (e.g., a reception unit 125), a sensor for detecting a use environment of the electronic device 100 (e.g., a proximity sensor or an illuminance sensor), and the like may be disposed on the front face of the electronic device 100. The rear cover 104 is mounted on the rear face of the housing 101 to provide a portion of the exterior of the electronic device 100, and a camera module 115 and the like may be disposed on the rear face of the electronic device 100. A power key 113*a*, one or more volume keys 113*b*, and the like may be disposed on the opposite side faces of the housing 101. According to the function of the electronic device 100, a connector hole for connecting an external device or a through-hole 117 for mounting the tray 103 may be disposed on the upper end face, the side face, and/or the lower end face of the housing 101.

In a side face or an upper/lower end face of the housing 101, the arrangement of the keys 113*a* and 113*b*, the connector hole, the through-hole 117 for the tray 103, and the like may vary according to an embodiment of the present disclosure. For example, while FIG. 4 discloses an example in which the tray 103 or the through-hole 117 is formed in the upper end face of the housing 101, the tray 103 or the through-hole 117 may be disposed on the opposite side faces or the lower end face of the housing 101. Other function keys, sensors and the like, which have not been described, may be disposed on the side faces of the housing 101. For example, a hot key that activates a multimedia reproduction mode or provides a function of music reproduction, termination, pause, and the like, may be disposed on a side face of the housing 101. As described above, the arrangement of the power key 113*a*, the volume key 113*b*, the connector hole, the tray 103 (or the through-hole 117), the hot key for a specific function, and the like may vary according to the use, function, external appearance, and the like of the electronic device 100.

According to an embodiment of the present disclosure, the electronic device 100 includes a circuit board 151 that is disposed within the housing 101. The circuit board 151 may be disposed between a plate-shaped structure (e.g., the biasing member 153) to be described below and the second face (e.g., the rear cover 104) within the housing 101. Various electronic components (e.g., integrated circuit chips) may be disposed on the circuit board 151. A support member 151 may be disposed between the housing 101 and the rear cover 104 to improve the rigidity and to protect the circuit board 151 and the like. The support member 157 may be integrally manufactured with the rear cover 104 such that the electronic device 100 has a uni-body structure in external appearance.

According to an embodiment of the present disclosure, the electronic device 100 may include a socket 155 for mounting or connecting a storage medium and the like. The socket 155 may be disposed between the circuit board 151 and the biasing member 153. The socket 155 includes a first plate 155a that faces in the first direction, a second plate 155b that faces in the second direction, and a space formed between the first plate 155a and the second plate 155b. As will be described below, one or more storage mediums mounted or connected to the socket 155 may be accommodated in the space formed between the first plate 155a and the second plate 155b. An entrance 155c may be formed on one side of the socket 155, and the space of the socket 155 may lead to the entrance 155c. The entrance 155c may face the through-hole 117 and/or be aligned with the through-hole 117. For example, a storage medium and/or the tray 103 may be moved through the through-hole 117 and the entrance 155c in a sliding manner to enter the space of the socket 155. For example, the tray 103 may transport a storage medium, such as an external memory card or a SIM card, to place the storage medium in the space of the socket 155.

The storage medium mounted and connected to the socket 155 may be an example of the external memory 23b of FIG. 1. The subscriber identification module 22g of FIG. 1 may be provided as a storage medium type that is different from that of the external memory 23b. The socket 155 is mounted on the circuit board 151 to be electrically connected with at least one of the electronic components of the circuit board 151. The circuit board 151 may be mounted in the housing 101 in the state where the entrance of the socket 155 (e.g., the entrance where the above-described tray 103 and/or the storage medium enter) is aligned with the through-hole 117.

According to an embodiment of the present disclosure, the electronic device 100 may include a plate-shaped structure (e.g., the biasing member 153) between the through-hole 117 and the entry of the socket 155. The biasing member 153 may be disposed between the front cover 102 (e.g., a window or a window with a display module) and the second face (e.g., the rear cover 104), and the tray 103 may include a protrusion protruding onto the entry path of the tray 103 into the socket 155 (e.g., a biasing piece and/or a biasing projection to be described later). While the tray 103 is inserted into or extracted from the housing 101, the biasing member 153 may elastically bias the storage medium, such as a memory card or a SIM card, between the through-hole 117 and the entrance of the socket 155 in order to cause the storage medium to come in close contact with the tray 103 or to limit the movement range of the storage medium. For example, the protrusion (e.g., a biasing piece and/or a biasing projection) may protrude toward the second plate 155b on the biasing member 153, and when the tray 103 is inserted in the state where the storage medium is seated therein, the protrusion may elastically bias the storage medium (e.g., an external memory and/or a SIM card) seated in the tray 103 toward the second plate 155b. The biasing member 153 may be integrally formed with a side face of the housing 101. For example, in an embodiment of the present disclosure, the plate-shaped structure (e.g., the biasing member 153) may be attached to an inner flat plane of the housing, but the plate-shaped structure including the biasing member 153 may be formed of the same material (e.g., a metal) as a side face on a portion of the housing 101. The first plate 155a may have an area that is smaller than the second plate 155b, and the biasing member 153 and/or the protrusion, may be disposed through a portion where the first plate 155a and the second plate 155b do not overlap each other when viewed from the upper side of the first plate 155a.

Figure 5:
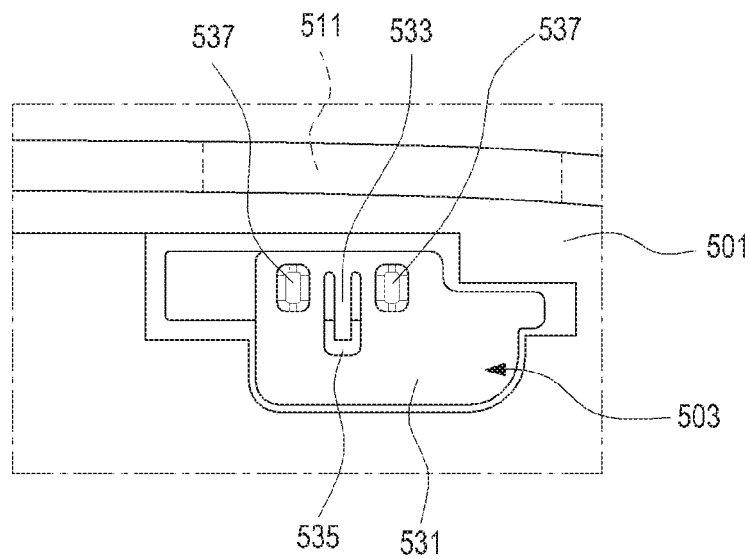
FIG. 5 is a plan view illustrating a biasing member mounted in an electronic device, according to an embodiment of the present disclosure.

FIG. 5 is a plan view illustrating a biasing member mounted in an electronic device, according to an embodiment of the present disclosure.

Referring to FIG. 5, the biasing member 503 may be mounted adjacent to (or attached to) one face of the housing 501 (e.g., the through-hole 511 within the housing 501). The biasing member 503 may have a leaf spring structure obtained by stamping a metal plate. For example, the biasing member 503 includes a fixing piece 531 that is formed substantially as a plate shape and is mounted in the housing 501, and at least one biasing piece 533 that is a protrusion extending and bent from the fixing piece 531 so as to protrude from one face of the fixing piece 531. The biasing piece 533 is positioned where the tray 103 is inserted/extracted, and is formed of an elastic body capable of elastically biasing a portion of the storage medium seated in the tray while the tray is inserted or extracted.

In an embodiment of the present disclosure, the fixing piece 531 may have a slit 535 that is formed along a substantially U-shaped path, and the biasing piece 533, which is provided as a protrusion, may be formed by deforming, in a curved form, a portion of the fixing piece 531, which is surrounded by the slit 535. For example, the slit 535 may be formed to surround at least a portion of the biasing piece 533. The biasing member 503 may further include one or more biasing projections 537 that protrude from one face of the fixing piece 531 in the same direction as the biasing piece 533 protrudes. During the insertion or extraction of the above-mentioned tray, the biasing projections 537 are capable of elastically biasing different portions of the storage medium seated in the tray. The biasing piece 533 may be disposed between the pair of biasing projections 537.

In an embodiment of the present disclosure, the biasing piece 533 and/or the biasing projections 537 elastically bias a storage medium to bring the storage medium in close contact with the tray, but the present disclosure is not limited thereto. For example, the biasing piece 533 and/or the biasing projections 537 do not necessarily bias a storage medium as long as the storage medium smoothly enters the through-hole 117 of the housing 101 and/or the entrance of the socket 155 even if the storage medium is moved in the tray. For example, the biasing piece 533 and/or the biasing projections 537 may limit the movement range of the storage medium such that the storage medium is capable of smoothly entering the through-hole of the above-mentioned housing and/or the entrance of the socket while allowing movement of the storage medium seated in the tray.

Figure 6:
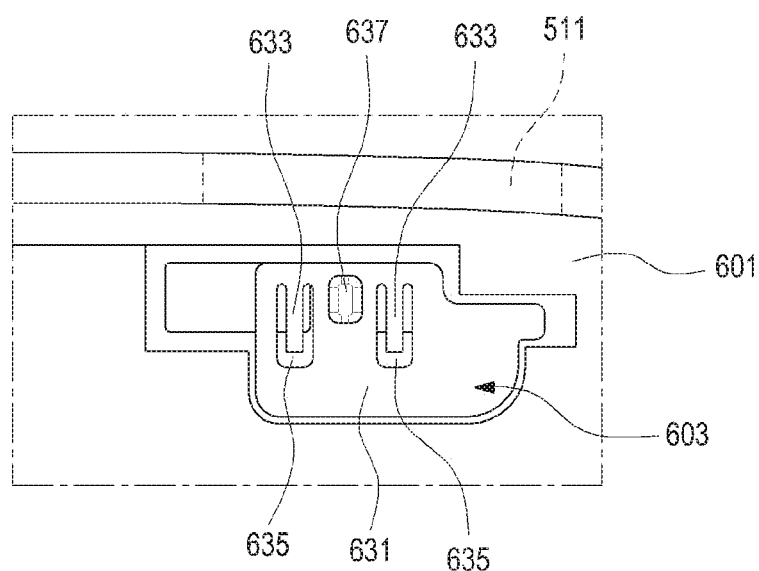
FIGS. 6 and 7 illustrate modifications of a biasing member of an electronic device, according to an embodiment of the present disclosure.
Figure 7:
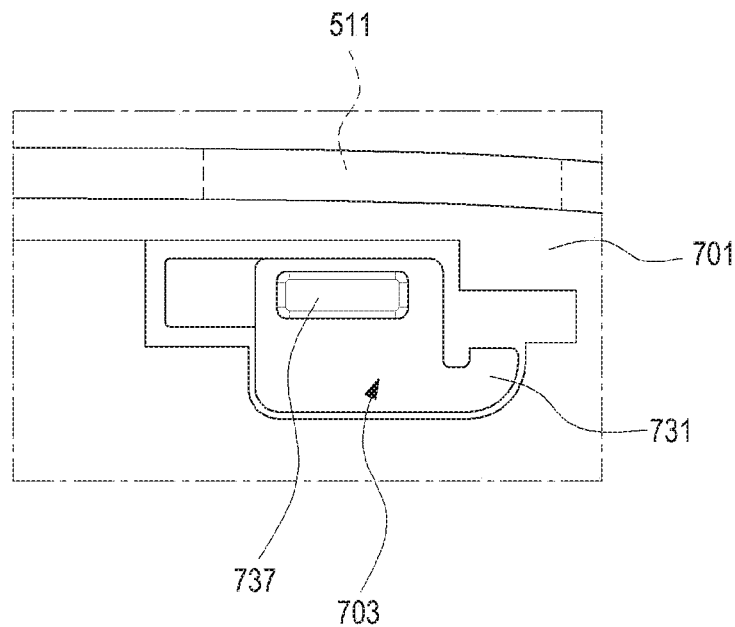

FIGS. 6 and 7 illustrate modifications of a biasing member of an electronic device, according to an embodiment of the present disclosure.

Referring to FIG. 6, the biasing member 603 includes a fixing piece 631 mounted or attached inside a housing 601, and a pair of biasing pieces 633, each of which is partially surrounded by a slit 635 and extends in a curved form to protrude from one face of the fixing piece 631, and may further include a biasing projection 637 that protrudes between the biasing pieces 633 from one face of the fixing piece 631. The biasing pieces 633 and/or the biasing projection 637 may elastically bias a storage medium seated in the tray, or may limit the movement range of the storage medium in the tray such that the insertion/extraction operation of the tray in which the storage medium is seated may be performed smoothly.

Referring to FIG. 7, a biasing member 703 includes a fixing plate 731, of which one face is attached to a housing 701, and a biasing projection 737 protruding from the other face of the fixing plate 731. The biasing projection 737 may be positioned between the through-hole 117 and the entrance of the socket 155, and may protrude into the entry path of the tray that is inserted into/extracted from the housing 101. For example, the biasing projection 737 may elastically bias a storage medium seated in the tray, or may limit the movement range of the storage medium in the tray such that the insertion/extraction operation of the tray in which the storage medium is seated may be performed smoothly.

According to an embodiment of the present disclosure, the biasing members 153, 503, 603, and 703 may be made of an elastic member (e.g., rubber, silicon resin, urethane resin, or plastic resin) and/or a metal plate. For example, the above-mentioned biasing members may provide an elastic force by physical characteristic of the materials and/or a processed shape thereof. The portions of the above-mentioned biasing members (e.g., the biasing pieces 533, 633, and 733 and/or the biasing projections 537, 637, and 737), which elastically bias the tray or a storage medium seated in the tray, may have a curved line or a curved surface, and may be connected with the above-mentioned fixing pieces and/or the fixing plates with the curved line and/or the curved surface.

Figure 8:
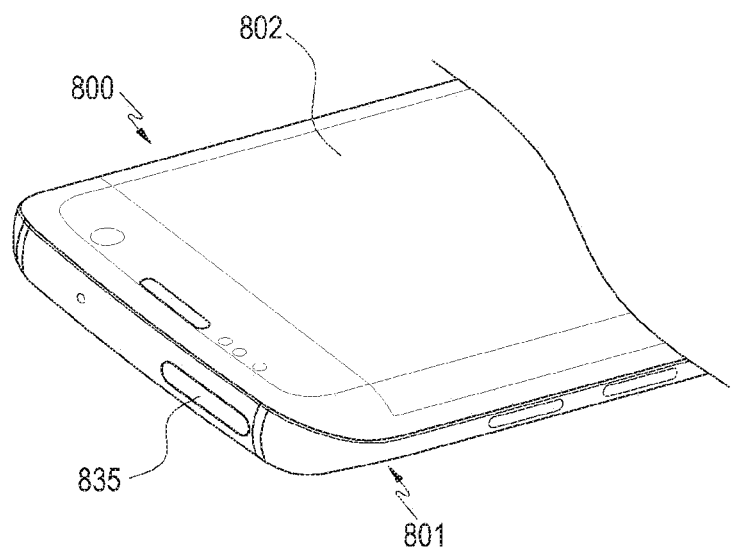
FIG. 8 illustrates a tray which is inserted into a housing in an electronic device, according to an embodiment of the present disclosure.

FIG. 8 illustrates a tray which is inserted into a housing in an electronic device, according to an embodiment of the present disclosure.

Figure 9:
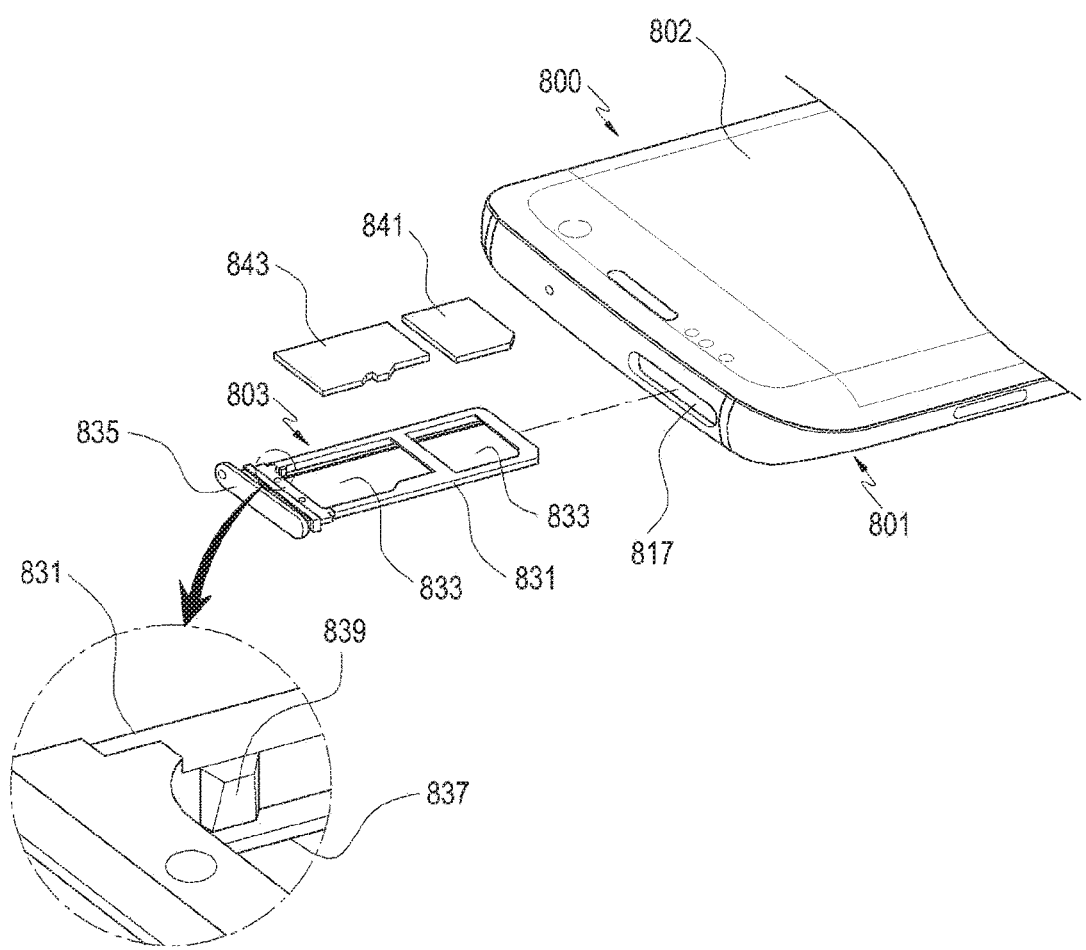
FIG. 9 is a perspective view illustrating a tray which is extracted from a housing in an electronic device, according to an embodiment of the present disclosure.

FIG. 9 is a perspective view illustrating a tray which is extracted from the housing in an electronic device, according to an embodiment of the present disclosure.

Referring to FIGS. 8 and 9, according to an embodiment of the present disclosure, an electronic device 800 includes a tray 803 inserted/extracted through a through-hole 817 of the housing 801. The tray 803 may be inserted into the housing 801 carrying at least one storage medium 841 or 843 used for user authentication and/or expansion of storage capacity or function of the electronic device 800. The storage mediums 841 and 843 may include, for example, a subscriber identification module card 841 (SIM card) and/or a memory card 843 (e.g., a micro SD card).

According to an embodiment of the present disclosure, a front cover 802 and/or a display device may be mounted on the front face of the housing 801, and the through-hole 817 may be disposed in the upper end face that is connected to the front face of the housing 801. The position of the through-hole 817 is not limited by a specific embodiment of the present disclosure.

According to an embodiment of the present disclosure, the tray 803 includes a base plate 831 and a cover member 835 formed on one end of the base plate 831. The base plate 831 may provide a space for seating a storage medium (e.g., the SIM card 841 and/or a memory card 843) therein. For example, the tray 803 may include one or more seating holes 833 formed through the base plate 831, one or more support ribs 837, and/or one or more seating projections 839. The seating holes 833 may have a shape that corresponds to the shape of the storage medium to be seated therein, and the support ribs 837 may be disposed on the seating holes 833 to support an edge portion of one face of each of the storage mediums 841 and 843. For example, when the storage mediums 841 and 843 enter the seating holes 833, the support ribs 837 support the edge portions of the storage mediums 841 and 843 such that the storage mediums 841 and 843 may be seated therein. The seating projections 839 may protrude from the inner walls of the seating holes 833, and when the storage mediums 841 and 843 are disposed in the seating holes 833, the seating projections 839 may bias the side walls of the storage mediums 841 and 843 to fix the storage mediums 841 and 843 in the seating holes 833.

Referring to FIG. 9, the storage mediums 841 and 843 are seated in the top face of the base plate 831, and the biasing members 153, 503, 603 and 703 may elastically bias the storage mediums 841 and 843 from the top face side of the base plate 831. The seating projections 839 may have an inclined shape, for example, a shape that protrudes more as it approaches the top face of the base plate 831 and comes closer to the inner wall of a seating hole 833 as it approaches a support rib 837. When the seating projections 839 have an inclined shape, the storage mediums 841 and 843 may be supported by the inclined faces of the seating projections 839 in such a manner that the storage mediums 841 and 843 come in closer contact with the support ribs 837. For example, by the shapes of the base plate 831 and/or the seating projections 839 themselves, the storage mediums 841 and 843 may be securely seated in the base plate 831.

According to an embodiment of the present disclosure, the cover member 835 may allow the user to readily handle the tray 803, and may cover the through-hole 817 when the tray 803 is inserted into the housing 801. For example, the cover member 835 may cover the through-hole 817 to form a part of the external appearance of the housing 801 while preventing foreign matter and the like from entering the housing 801.

Figure 10:
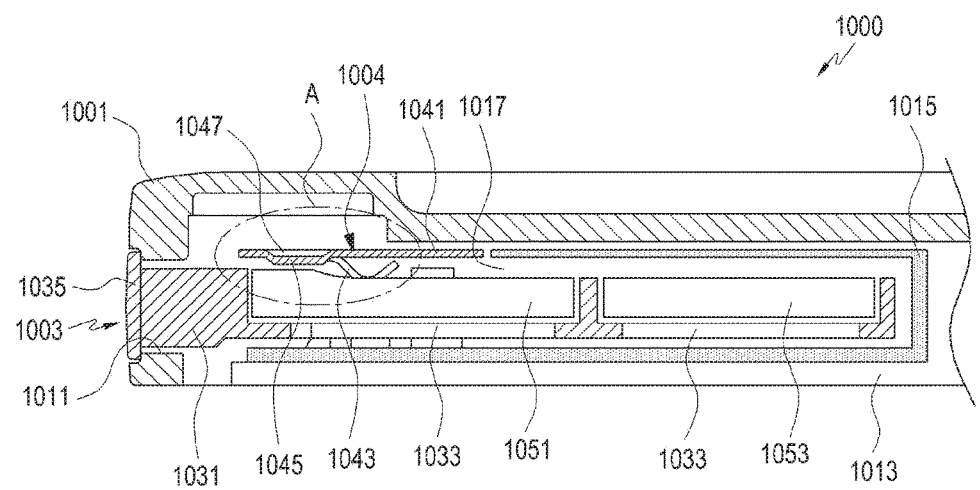
FIG. 10 is a side cross-sectional view illustrating a tray which is inserted into a housing in an electronic device, according to an embodiment of the present disclosure.

FIG. 10 is a side cross-sectional view illustrating a tray which is inserted into a housing in an electronic device, according to an embodiment of the present disclosure.

Figure 11:
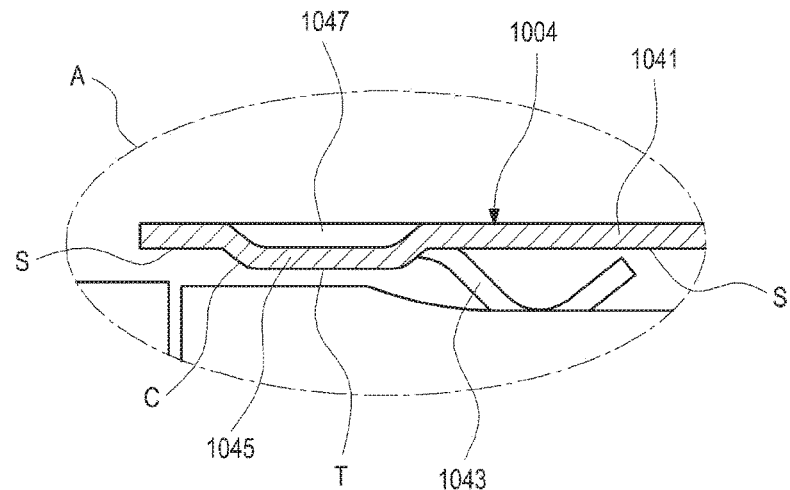
FIG. 11 is a view illustrating the portion "A" illustrated in FIG. 10 in an enlarged scale, according to an embodiment of the present disclosure.

FIG. 11 is a view illustrating a portion "A" illustrated in FIG. 10 in an enlarged scale, according to an embodiment of the present disclosure.

Referring to FIGS. 10 and 11, when the tray 1003 is inserted into the housing 1001 in the state where storage mediums 1051 and 1053 are seated, the storage mediums 1051 and 1053 may be at least partially inserted into the socket 1015. When the socket 1015 includes a plurality of connection terminals (e.g., a C-clip, a pogo pin and a pin), the connection terminals may be in contact with contact pads on each of the storage mediums 1051 and 1053, respectively. For example, the socket 1015 may connect the storage mediums 1051 and 1053 to electronic components (e.g., the processor 21 or the communication module 22 in FIG. 1) provided on the circuit board 1013 of the electronic device 1000 through the connection terminals.

In an embodiment of the present disclosure, a biasing member 1004 may be disposed between the through-hole 1011 formed in the housing 1001 and the entrance 1017 of the socket 1015 in the electronic device 1000. The biasing member 1004 includes a biasing piece 1043 extending from a fixing piece 1041 and/or a biasing projection 1045 protruding from the fixing piece 1041 to elastically bias the storage mediums 1051 and 1053 or limit the movement range of the storage mediums 1051 or 1053 during the insertion/extraction of the tray 1003. When the tray 1003 is completely inserted into the housing 1001, one of the storage mediums 1051 and 1053 may be positioned to face the biasing member 1004, and the biasing member 1004 may elastically bias the storage medium. The storage mediums 1051 and 1053 may be brought into close contact with the tray 1003 by the biasing member 1004, and the connection pads formed on one face of each of the storage mediums 1051 and 1053 may come in contact with the connection terminals of the socket 1015 through at least a portion of the seating hole 1033.

In an embodiment of the present disclosure, when the fixing piece 1041 is a metal plate, and the biasing projection 1045 protrudes on one face of the fixing piece 1041, a dummy recess 1047 may be formed on the other face of the fixing piece 1041 at a position corresponding to the biasing projection 1045. For example, the biasing member 1004 may be manufactured by processing a metal plate using a stamping process. While the tray 1003 is inserted/extracted, the biasing piece 1043 and/or the biasing projection 1045 may come in sliding contact with the storage mediums 1051 and 1053. The biasing piece 1043 and/or the biasing projection 1045 may have a curved surface form in a portion where the biasing piece 1043 and/or the biasing projection 1045 come in contact with the storage mediums 1051 and 1053 to prevent the surfaces of the storage mediums 1051 and 1053 from being damaged by the sliding contact. The biasing piece 1043 and/or the top face T of the biasing projection 1045 and one face S of the fixing piece 1041 are connected to each other by a curved line or a curved surface C such that the surfaces of the storage mediums 1051 and 1053 may be prevented from being damaged by the sliding contact.

Figure 12:
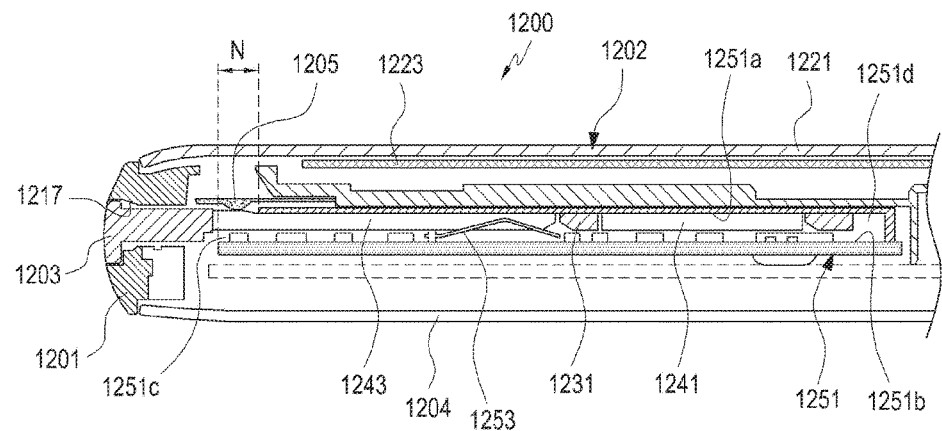
FIG. 12 is a side cross-sectional view illustrating a tray which is inserted into the housing in an electronic device, according to an embodiment of the present disclosure.

FIG. 12 is a side cross-sectional view illustrating a tray which is inserted into a housing of an electronic device, according to an embodiment of the present disclosure.

Referring to FIG. 12, according to an embodiment of the present disclosure, the electronic device 1200 includes a housing 1201, a front cover 1202 mounted on the front face of the housing 1201, and a rear cover 1204 mounted on the rear face of the housing 1201. The front cover 1202 may include a window member 1221 and a display panel 1223 (e.g., the panel 26*a* in FIG. 1) mounted on the inner face of the window member 1221 to function as a display device. A touch panel may be incorporated into the window member 1221 or the display panel 1223 so that the front cover 1202 may provide a function as an input device. In the upper end face of the housing 1201, a through-hole 1217 may be formed to provide a path for the insertion/extraction of the tray 1203. Storage mediums 1241 and 1243 may be seated in the base plate 1231 of the tray 1203. The storage mediums 1241 and 1243 may enable user authentication and/or expansion of storage capacity by being accommodated in the socket 1251 within the housing 1201.

In an embodiment of the present disclosure, the socket 1251 includes a first plate 1251*a* that faces in a first direction, a second plate 1251*b* that faces in a second direction, and a space 1251*d* formed between the first plate 1251*a* and the second plate 1251*b*. The storage mediums 1241 and 1243 mounted and connected to the socket 1251 may be accommodated in the space 1251*d*. An entrance 1251*c* may be formed on one side of the socket 1251, and the space 1251*d* may be connected to the entrance 1251*c*. The entrance 1251*c* may face the through-hole 1217 and/or be aligned with the through-hole 1217.

In an embodiment of the present disclosure, the socket 1251 includes a plurality of conductive contacts 1253 corresponding to the connection pads of the storage mediums 1241 and 1243 to be electrically connected with the storage mediums 1241 and 1243. The plurality of conductive contacts 1253 may extend from the second plate (e.g., the second plate 155*b* in FIG. 4) of the socket 1251, and may face the space of the socket 1251.

According to an embodiment of the present disclosure, the electronic device 1200 includes a biasing member 1205 between the through-hole 1217 and the socket 1251. When the tray 1203 is completely inserted into the housing 1201, the major portions of the storage mediums 1241 and 1243 may be substantially accommodated within the socket 1251. While the tray 1203 is inserted into/extracted from the housing 1201 and/or the socket 1251, the biasing member 1205 may elastically bias the storage mediums 1241 and the 1243 or may limit the movement range of the storage mediums 1241 and 1243 between the through-hole 1217 and the socket 1251 such that the insertion/extraction of the tray 1203 may be performed smoothly.

In an embodiment of the present disclosure, the first plate 1251*a* may have an area that is smaller than that of the second plate 1251*b*. For example, when the socket 1251 is viewed from the upper side of the first plate 1251*a*, a region N where the first plate 1251*a* and the second plate 1251*b* do not overlap with each other may be formed. The protrusion of the biasing member 1205 may be disposed on the region N where the first plate 1251*a* and the second plate 1251*b* do not overlap each other.

Figure 13:
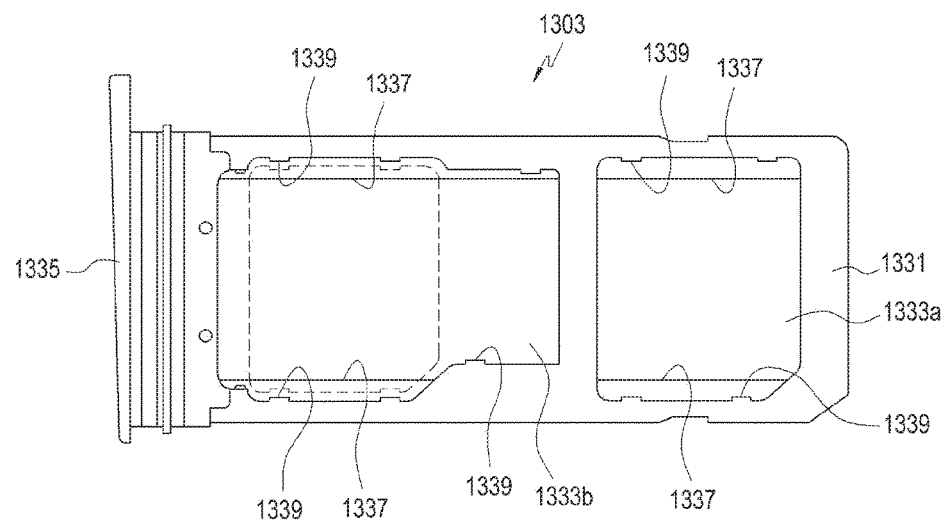
FIG. 13 is a plan view illustrating a tray of an electronic device, according to an embodiment of the present disclosure.

FIG. 13 is a plan view illustrating a tray of an electronic device, according to an embodiment of the present disclosure.

Referring to FIG. 13, according to an embodiment of the present disclosure, the tray 1303 of the electronic device includes a base plate 1331, a cover member 1335, at least one seating hole, and/or a support rib 1337.

According to an embodiment of the present disclosure, the base plate 1331 has a substantially flat plate shape, and at least one seating hole is formed to seat storage mediums 841 and 843 therein. The base plate 1331 includes a first seating hole 1333*a* and a second seating hole 1333*b*. The first seating hole 1333*a* may provide, for example, a space for mounting a SIM card (e.g., a nano SIM card), and the second seating hole 1333*b* may provide, for example, a space for mounting a memory card (e.g., a micro SD card). The second seating hole 1333*b* may be formed to selectively mount a memory card or a SIM card therein. For example, the region indicated by a dotted line within the second seating hole 1333*b* may be a region in which a nano SIM card may be mounted.

According to an embodiment of the present disclosure, the cover member 1335 may be formed on one end of the base plate 1331, and may allow a user to readily handle the tray 1303. When the tray 1303 is mounted in the housing 801 of the electronic device 800, the cover member 1335 may cover the through-hole 817.

In an embodiment of the present disclosure, a lever may be disposed within the housing of the electronic device, and a manipulation hole may be formed in the cover member 1335. When extracting the tray 1303, the user may manipulate the lever through the manipulation hole formed in the cover member 1335 using a separate instrument (a push rod or a pin). The lever disposed within the housing may push the tray 1303 to move such that the cover member 1335 protrudes to the outside of the housing.

According to an embodiment of the present disclosure, the support ribs 1337 may be in contact with one face of the base plate 1331, and may be disposed on the at least one seating hole (e.g., the first seating hole 1333*a* and the second seating hole 1333*b*). When the storage mediums are seated in the at least one seating hole on the top face of the base plate 1331, the support ribs 1337 may support the edge portions of the storage mediums at the bottom face side of the base plate 1331. One face of each storage medium may be partially exposed from the bottom face of the base plate 1331 through the at least one seating hole between the support ribs 1337. The connection pads of the storage mediums may be exposed to the bottom face of the base plate 1331 to come in contact with connection terminals of the socket 1251.

According to an embodiment of the present disclosure, the tray 1303 may further include one or more seating projections 1339 that are formed on the inner walls of the at least one seating hole. The seating projections 1339 may be formed on the opposite inner walls among the inner walls of the at least one seating hole. When the storage mediums are seated in the at least one seating hole, the seating projections 1339 may fix the storage mediums within the at least one seating hole by biasing the side walls of the storage mediums. The seating projections 1339 may include an inclined face such that the storage mediums may come in close contact with the support ribs 1337 when the storage mediums are seated in the at least one seating hole.

Figure 14:
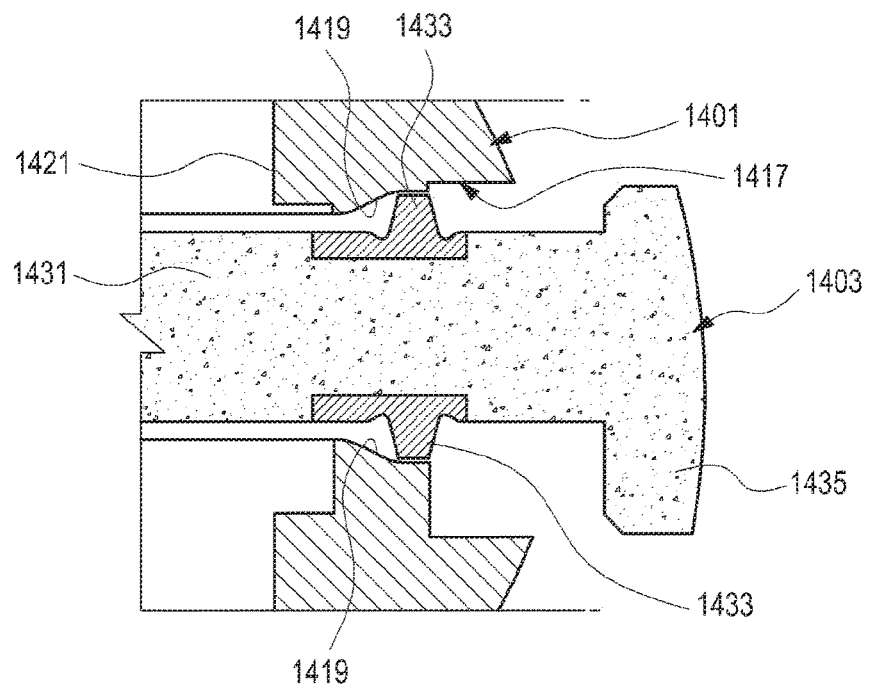
FIGS. 14 to 16 are views sequentially illustrating the movement of a tray which is inserted into a housing in an electronic device, according to an embodiment of the present disclosure.
Figure 15:
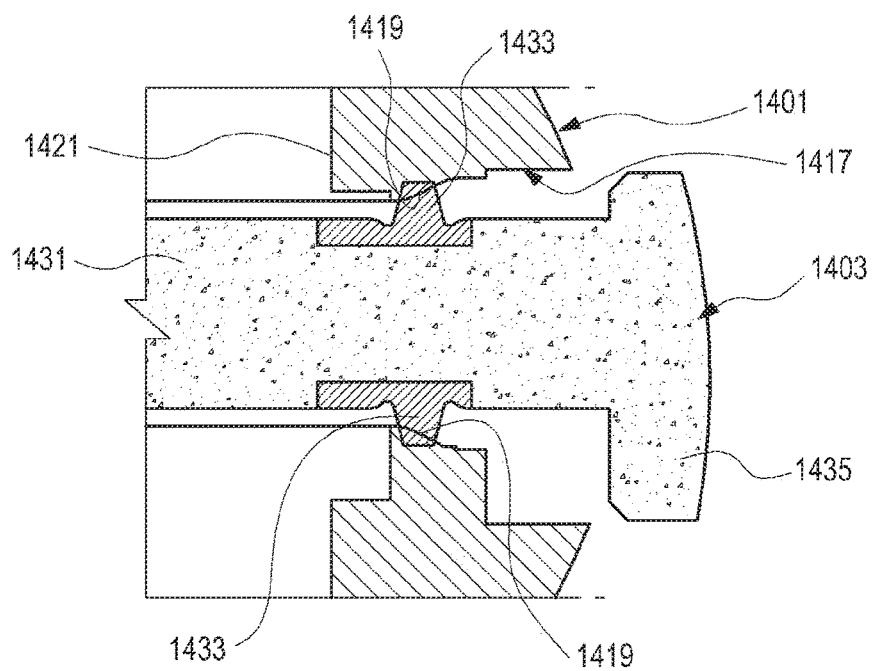
Figure 16:
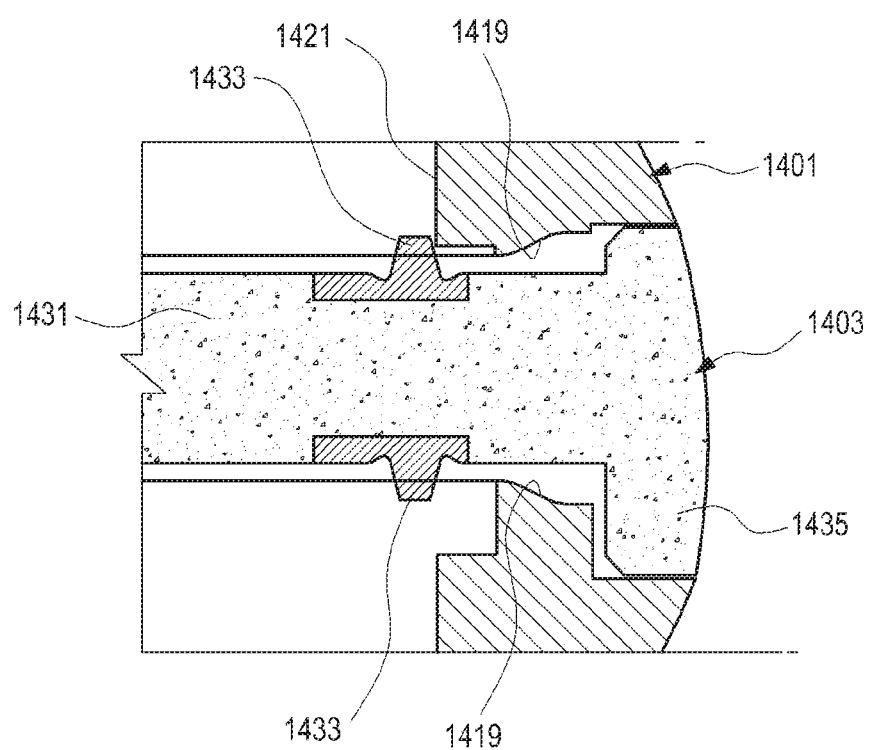

FIGS. 14 to 16 are views sequentially illustrating the movement of a tray which is inserted into a housing in an electronic device, according to an embodiment of the present disclosure.

Referring to FIGS. 14 to 16, the electronic device 100 includes a housing 1401 that is formed with a through-hole 1417. The through-hole 1417 includes an inclined face 1419 to guide the insertion of tray 1403, and the tray 1403 includes guide projections 1433 protruding from the outer peripheral face of the base plate 1431. The inclined faces 1419 may include a curved surface, and the through-hole 1417 may be formed to have a width that narrows toward the inside, from the outside of the housing 1401. The guide projections 1433 may be positioned adjacent to the cover member 1435 of the tray 1403, and may extend along the periphery of the base plate 1431. The guide projections 1433 may include an elastic body (e.g., a silicon resin, a urethane resin, or a plastic resin), and during the insertion of the tray 1403 into the through-hole 1417, the tray 1403 may rub against the inclined faces 1419 while being moved along the inclined faces 1419.

FIG. 15 illustrates a state in which the guide projections 1433 partially overlap with the housing 1401. During insertion of the tray 1403 through the through-hole 1417, the guide projections 1433 may contract while interfering with the inclined faces 1419. For example, the guide projections 1433 may be made of an elastic body which contracts during the insertion of the tray 1403 through the through-hole 1417. During the insertion of the tray 1403, the guide projections 1433 are gradually contracted while moving along the inclined faces 1419 as described above, such that the user may readily recognize that the tray 1403 is securely mounted. During the separation of the tray 1303 from the housing 1401 (e.g., the through-hole 1417), the frictional force between the guide projections 1433 and the inclined faces 1419 is gradually reduced such that the user may readily recognize that the restraint between the tray 1403 and the housing 1401 is gradually released.

According to an embodiment of the present disclosure, when the tray 1403 is completely inserted into the through-hole 1417, the outer face of the cover member 1435 may form a portion of the outer peripheral face of the housing 1401, and the cover member 1435 may cover the through-hole 1417. When the tray 1403 is completely inserted into the through-hole 1417, the guide projections 1433 may at least partially interfere with the side inner faces of the housing 1401 such that the tray 1403 may securely remain in the state where the tray 1403 inserted into the through-hole 1417 or the socket 1251.

According to an embodiment of the present disclosure, the guide projections 1433 may be formed over the entire periphery of the base plate 1431. When the tray 1403 is completely inserted into the housing 1401, the guide projections 1433 may be contracted where the guide projections 1433 interfere with the structure (e.g., the inner wall of the through-hole 1417) of the housing 1401 over the entire periphery of the base plate 1431. For example, the guide projections 1433 may come in close contact with the periphery of the through-hole 1417 to provide a sealing function (e.g., a waterproofing function).

According to an embodiment of the present disclosure, an electronic device includes a housing including a through-hole positioned in a side face, a socket disposed within the housing, and having an entrance aligned to the through-hole, a biasing member mounted on the housing, and disposed between the through-hole and the entrance of the socket, and a tray in which at least one storage medium is seated. The tray is inserted into/extracted from the housing through the through-hole, and inserted into the socket from the inside of the housing through the entrance. During the insertion or extraction of the tray, the biasing member may limit a movement range of the storage medium in the tray.

According to an embodiment of the present disclosure, a biasing member may be disposed between the through-hole and the entrance of the socket.

According to an embodiment of the present disclosure, the storage medium may include at least one of a subscriber identification module (SIM) card and a memory card.

According to an embodiment of the present disclosure, the biasing member may be formed as a leaf spring that includes a fixing piece mounted in the housing and a biasing piece extending in a curved form from the fixing piece to protrude from one face of the fixing piece, and during the insertion or extraction of the tray, the biasing piece may elastically bias a portion of the storage medium.

According to an embodiment of the present disclosure, the biasing member may include a slit that is formed in the fixing piece and surrounds a portion of the biasing piece.

According to an embodiment of the present disclosure, the biasing member may include a biasing projection protruding from one face of the fixing piece in a direction where the biasing piece protrudes, and during the insertion or extraction of the tray, the biasing projection may elastically bias another portion of the storage medium.

According to an embodiment of the present disclosure, the biasing member may further include a dummy recess formed on the other face of the fixing piece at a portion that corresponds to the biasing projection.

According to an embodiment of the present disclosure, the biasing projection may be disposed between the pair of biasing pieces.

According to an embodiment of the present disclosure, the biasing piece may be disposed between the pair of biasing projections.

According to an embodiment of the present disclosure, the upper face of the biasing projection and one face of the fixing piece may be connected to each other via a curved line or a curved surface.

According to an embodiment of the present disclosure, the biasing member may include a fixing plate, one face of which is attached to the housing, and a biasing projection protruding from the other face of the fixing plate.

According to an embodiment of the present disclosure, the upper face of the biasing projection and the other face of the fixing plate may be connected to each other via a curved line or a curved surface.

According to an embodiment of the present disclosure, the biasing member may be formed of an elastic material including rubber, silicon rubber, urethane resin, plastic resin, or a metal plate.

According to an embodiment of the present disclosure, the tray may further include a base plate having at least one seating hole formed through opposite faces thereof, a support rib disposed on the seating hole to support an edge portion of one face of the storage medium, and a seating projection formed on an inner wall of the seating hole, and the storage medium may be supported by the support rib and disposed in the seating hole, and the seating projection biases a side wall of the storage medium to fix the storage medium in the seating hole.

According to an embodiment of the present disclosure, the seating projection may be formed on each of opposite inner walls of the seating hole.

According to an embodiment of the present disclosure, the tray may further include a cover member formed on one end of the base plate, and when the tray is inserted into the housing, the cover member may cover the through-hole on an outer face of the housing.

According to an embodiment of the present disclosure, the biasing member may elastically bias at least a portion of the storage medium to bring the portion in close contact with the tray while the tray is inserted into the housing or extracted from the housing.

According to an embodiment of the present disclosure, the electronic device includes a housing including a first face that faces in a first direction, a second face that faces in a second direction that is opposite to the first direction, and a side face that at least partially encloses a space between the first face and the second face, the housing further including a through-hole in the side face, a touch screen display disposed within the housing, and exposed through the first face, a biasing member disposed between the display and the second face within the housing, and integrally formed with the side face, a circuit board disposed between the biasing member and the second face within the housing, a socket disposed between the circuit board and the biasing member within the housing and including a first plate that faces in the first direction and a second plate that faces in the second direction, the socket further including an entrance formed to face the through-hole and a space leading to the entrance, a plurality of conductive contacts disposed at a side of the second plate to face the space of the socket, a tray that slides through the through-hole and the entrance, and includes a seating hole to transport a storage medium and/or a SIM card, and a protrusion that protrudes from the biasing member toward the second plate and is configured to elastically bias the storage medium and/or the SIM card toward the second plate when the tray is inserted into the space of the socket in a state where the storage medium and/or the SIM card are included in the tray.

According to an embodiment of the present disclosure, the protrusion may include an elastic body.

According to an embodiment of the present disclosure, the first plate may have an area smaller than that of the second plate, and the protrusion may be disposed through a portion of the first plate that does not overlap the second plate when viewed from an upper side of the first plate.

According to an embodiment of the present disclosure, the side face and the biasing member are formed of the same material.

According to an embodiment of the present disclosure, the side face and the biasing member may be formed of the same material which may include a metal.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a housing including a through-hole positioned in a side face;
    a socket disposed within the housing, and having an entrance aligned with the through-hole;
    a biasing member mounted on the housing; and
    a tray that transports at least one storage medium, and is inserted into/extracted from the housing through the through-hole, the tray being inserted into the socket through the entrance in the housing,
    wherein, during insertion or extraction of the tray, the biasing member limits a movement range of the storage medium in the tray such that the biasing member is in contact with and elastically biases the storage medium seated in the tray, and
    wherein the biasing member is disposed between the through-hole and the entrance of the socket.

2. The electronic device of claim 1, wherein the storage medium includes at least one of a subscriber identification module (SIM) card and a memory card.

3. An electronic device, comprising:
    a housing including a through-hole positioned in a side face;
    a socket disposed within the housing, and having an entrance aligned with the through-hole;
    a biasing member mounted on the housing; and
    a tray that transports at least one storage medium, and is inserted into/extracted from the housing through the through-hole, the tray being inserted into the socket through the entrance in the housing,
    wherein the biasing member is formed as a leaf spring that includes a fixing piece mounted to the housing and a biasing piece extending in a curved form from the fixing piece to protrude from one face of the fixing piece, and
    wherein, during the insertion or extraction of the tray, the biasing piece elastically biases a portion of the storage medium.

4. The electronic device of claim 3, wherein the biasing member includes a slit that is formed in the fixing piece and surrounds a portion of the biasing piece.

5. The electronic device of claim 3, wherein the biasing member includes at least one biasing projection protruding from one face of the fixing piece in a direction where the biasing piece protrudes, and
    wherein, during the insertion or extraction of the tray, the biasing projection elastically biases another portion of the storage medium.

6. The electronic device of claim 5, wherein the biasing member further includes a dummy recess formed on another face of the fixing piece at a portion that corresponds to the biasing projection.

7. The electronic device of claim 5, wherein the biasing projection is disposed between a pair of biasing pieces.

8. The electronic device of claim 5, wherein the biasing piece is disposed between a pair of biasing projections.

9. The electronic device of claim 5, wherein an upper face of the biasing projection and one face of the fixing piece are connected to each other along a curved line or a curved surface.

10. The electronic device of claim 1, wherein the biasing member includes a fixing plate, one face of which is attached to the housing, and a biasing projection protruding from another face of the fixing plate.

11. The electronic device of claim 10, wherein the upper face of the biasing projection and the other face of the fixing plate are connected to each other along a curved line or a curved surface.

12. The electronic device of claim 1, wherein the biasing member is formed of a metal plate or an elastic material including at least one of rubber, silicon rubber, urethane resin, and plastic resin.

13. The electronic device of claim 1, wherein the tray further includes a base plate having at least one seating hole formed through opposite faces thereof, a support rib disposed on the seating hole to support an edge portion of one face of the storage medium; and a seating projection formed on an inner wall of the seating hole, and wherein the storage medium is supported by the support rib and disposed in the seating hole, and the seating projection biases a side wall of the storage medium to fix the storage medium in the seating hole.

14. The electronic device of claim 13, wherein the seating projection is formed on each of opposite inner walls of the seating hole.

15. The electronic device of claim 13, wherein the tray further includes a cover member formed on one end of the base plate, and wherein, when the tray is inserted into the housing, the cover member covers the through-hole on an outer face of the housing.

16. The electronic device of claim 1, wherein the biasing member elastically biases the storage medium to bring at least a portion of the storage medium in close contact with the tray while the tray is inserted into the housing or extracted from the housing.

17. An electronic device comprising:
a housing including a first face that faces in a first direction, a second face that faces in a second direction that is opposite to the first direction, and a side face that at least partially encloses a space between the first face and the second face, the housing further including a through-hole in the side face;
a touch screen display disposed within the housing, and exposed through the first face;
a biasing member disposed between the display and the second face within the housing, and integrally formed with the side face;
a circuit board disposed between the biasing member and the second face within the housing;
a socket disposed between the circuit board and the biasing member within the housing and including a first plate that faces in the first direction and a second plate that faces in the second direction, the socket further including an entrance formed to face the through-hole and a space between the through-hole and the entrance;
a plurality of conductive contacts disposed at a side of the second plate to face the space of the socket;
a tray that slides through the through-hole and the entrance, and includes a seating hole to transport at least one of a storage medium and a SIM card; and
a protrusion that protrudes from the biasing member toward the second plate and is configured to elastically bias the at least one of a storage medium and a SIM card toward the second plate when the tray is inserted into the space of the socket in a state where the at least one storage medium and/or the SIM card are included in the tray.

18. The electronic device of claim 17, wherein the protrusion includes an elastic body.

19. The electronic device of claim 17, wherein the first plate has an area smaller than that of the second plate, and the protrusion is disposed through a portion of the first plate that does not overlap the second plate when viewed from an upper side of the first plate.

20. The electronic device of claim 17, wherein the side face and the biasing member are formed of the same material.

21. The electronic device of claim 20, wherein the material includes a metal.

* * * * *